June 30, 1942. G. B. LANGER 2,288,466
GLASSWARE FORMING APPARATUS
Filed Dec. 8, 1939 8 Sheets-Sheet 1

Fig.1.

Inventor
George B. Langer,
By
Attorneys

June 30, 1942. G. B. LANGER 2,288,466
GLASSWARE FORMING APPARATUS
Filed Dec. 8, 1939 8 Sheets-Sheet 6

Inventor
George B. Langer;

June 30, 1942.    G. B. LANGER    2,288,466
GLASSWARE FORMING APPARATUS
Filed Dec. 8, 1939    8 Sheets-Sheet 8

Inventor
George B. Langer,
By Emery Booth Ireland & Grill
Attorneys

Patented June 30, 1942

2,288,466

UNITED STATES PATENT OFFICE 2,288,466

GLASSWARE FORMING APPARATUS

George B. Langer, Anderson, Ind., assignor to Lynch Corporation, Anderson, Ind., a corporation of Indiana Application December 8, 1939, Serial No. 308,285

7 Claims. (Cl. 49—5)

The present invention relates to glassware forming apparatus and more specifically to the improved mechanism for operating certain types of apparatus in proper synchronized relation.

In the manufacture of articles of glassware, such as pressed ware, pressed and blown ware or blown ware, i. e., bottles, jars, tableware and the like, glass charges are periodically fed from a glass tank to a forming machine by a machine commonly referred to as a "feeder." Feeders conventionally are mechanically driven or pneumatically driven.

The glass charges which are prepared and measured by the feeder are delivered to a forming machine which conveniently may be an automatic machine for fabricating the charges into a finished article. The finished articles are thereafter delivered to a conveyor, which may conveniently be motor driven or pneumatically driven which transports the article to an annealing lehr.

The forming machine thus usually works in timed or synchronized relation with the one or more auxiliary mechanisms, i. e., the feeder and take-off conveyor, one or both of which may be mechanically operated or pneumatically operated.

My invention provides a new and improved motor operated driving mechanism for a forming machine having associated synchronizing mechanism for driving and operating one or more associated devices in proper synchronized relation therewith, with means to variably adjust the timed relation between such machines.

In order better to illustrate the nature of the invention, reference is made to the accompanying drawings showing one selected embodiment thereof, and in which

Fig. 3ª is a detail sectional view illustrating a portion of the mechanical drive for a mechanical feeder;

The glassware forming machine may be of any suitable construction and type for the manufacture of glass articles such as pressed ware, pressed and blown ware or blown narrow necked ware, provided the machine is of the motor driven type as distinguished from the pneumatic driven type.

In order to illustrate the wide applicability of the invention, the forming machine (Fig. 1) may be a motor driven tandem press machine employing two mold carriers 10—11, each provided with molds 12 and adapted to be presented successively at feeding or charging station C and subsequently move to a pressing station when the glass is subjected to the action of a pneumatically operated pressing plunger P or other suitable fabricating device as is understood.

The machine may conveniently be driven by means of an electric motor 13 through a chain drive 14 and pulley 15 (Fig. 2) keyed to a stub shaft 16 in housing 17. A gear 18 on shaft 16 meshes with a gear 19 keyed to a sleeve 20 forming a part of a constantly rotating clutch member 21 surrounding driven shaft 22. A shiftable clutch member 23 keyed to the shaft 22 may be moved into and out of engagement with the clutch member 21 by means of a lever 24 pivoted at 25 and connected by suitable linkage to a suitable mechanical means for shifting the clutch, as for example, a pneumatic cylinder and piston device 27.

Figures 2, 3A:
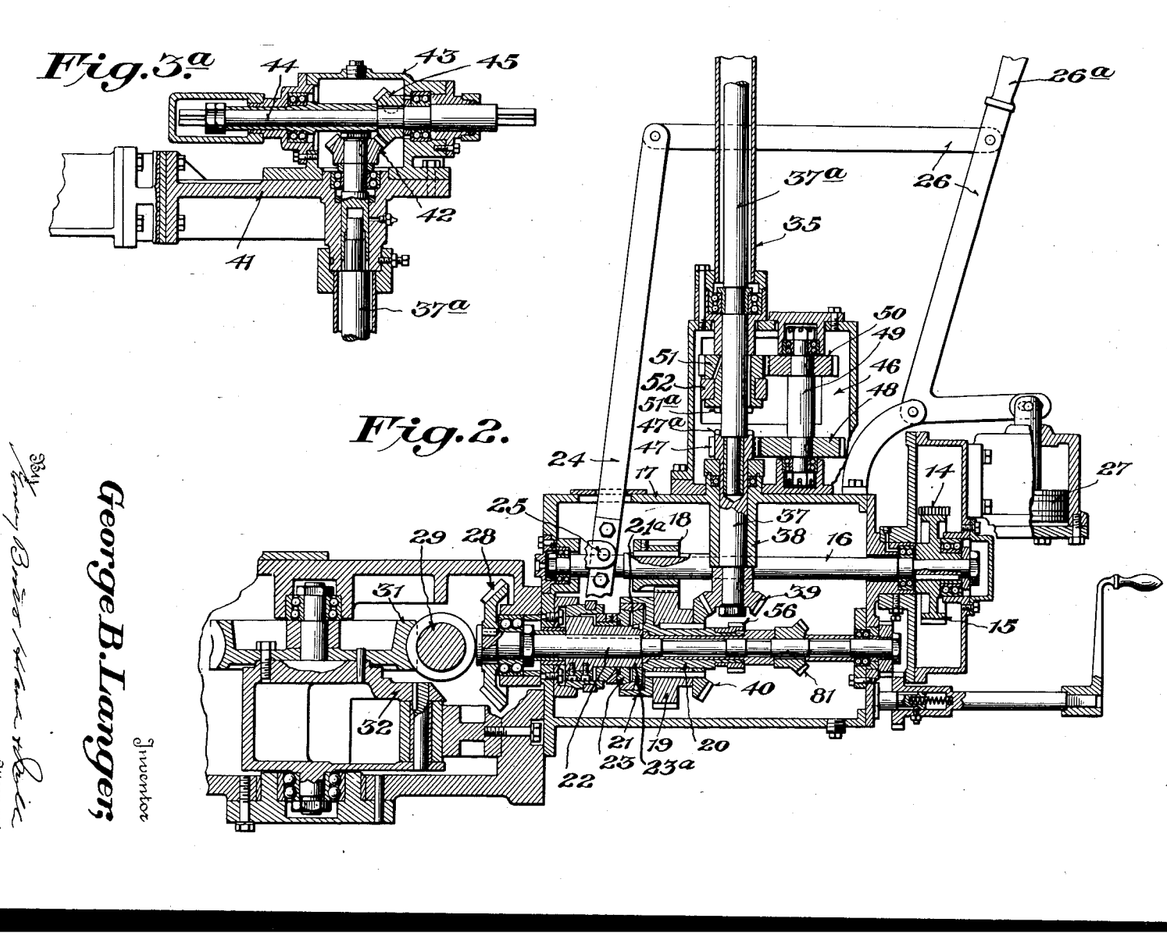
Fig. 2 is a transverse vertical sectional view taken on the lines 2—2 of Fig. 1.

Conveniently the clutch is of the cone faced type in which a ring member 21ª having a conical inner face, is forced into clutching engagement by the shiftable clutch member 23. The ring member 21ª is connected to a sleeve 23ª keyed to the shaft 22 so that when the member 23 is moved to the right as illustrated in Fig. 2, its conical face engages a complementary conical face of the ring member 21ª and forces the latter into clutching engagement with the member 21, thus driving the member 21, sleeve 23ª and shaft 22 in unison. This particular type of clutch is well known in the art and per se forms no part of the present invention.

The shaft 22 conveniently is the driving shaft of the forming machine, and when the clutch members 21—23 are in driving engagement, the shaft 22 is thereby rotated, which drives through bevel gears 28 (Figs. 1 and 2) the main shaft 29 of the forming machine for rotating the mold carriers. Conveniently there may be two aligned main shafts 29, one for each rotatable mold carrier, and each of said shafts may have a bevel gear 28 meshing with a similar gear in the shaft 22. When intermittent rotation of the mold carriers is desired, the shaft 29 may be provided with worms 30 meshing with worm wheels 31 on Geneva rotors 32 for driving Geneva wheels (not shown) on each side of the mold carriers as is understood.

According to the invention, there is associated with the driving mechanism suitable synchronizing timing mechanism for auxiliary apparatus, and these timing mechanisms are preferably driven from a continuously rotating part of the drive, for example the sleeve 20. Such synchronized timing mechanism advantageously may comprise a timing mechanism for pneumatically operating various pneumatically operated devices of the forming machine, a timing mechanism for operating a mechanically driven feeder, lehr conveyor or other auxiliary device, and a timing mechanism for pneumatically operating a pneumatically operated feeder, lehr conveyor or other auxiliary device.

Figure 3:
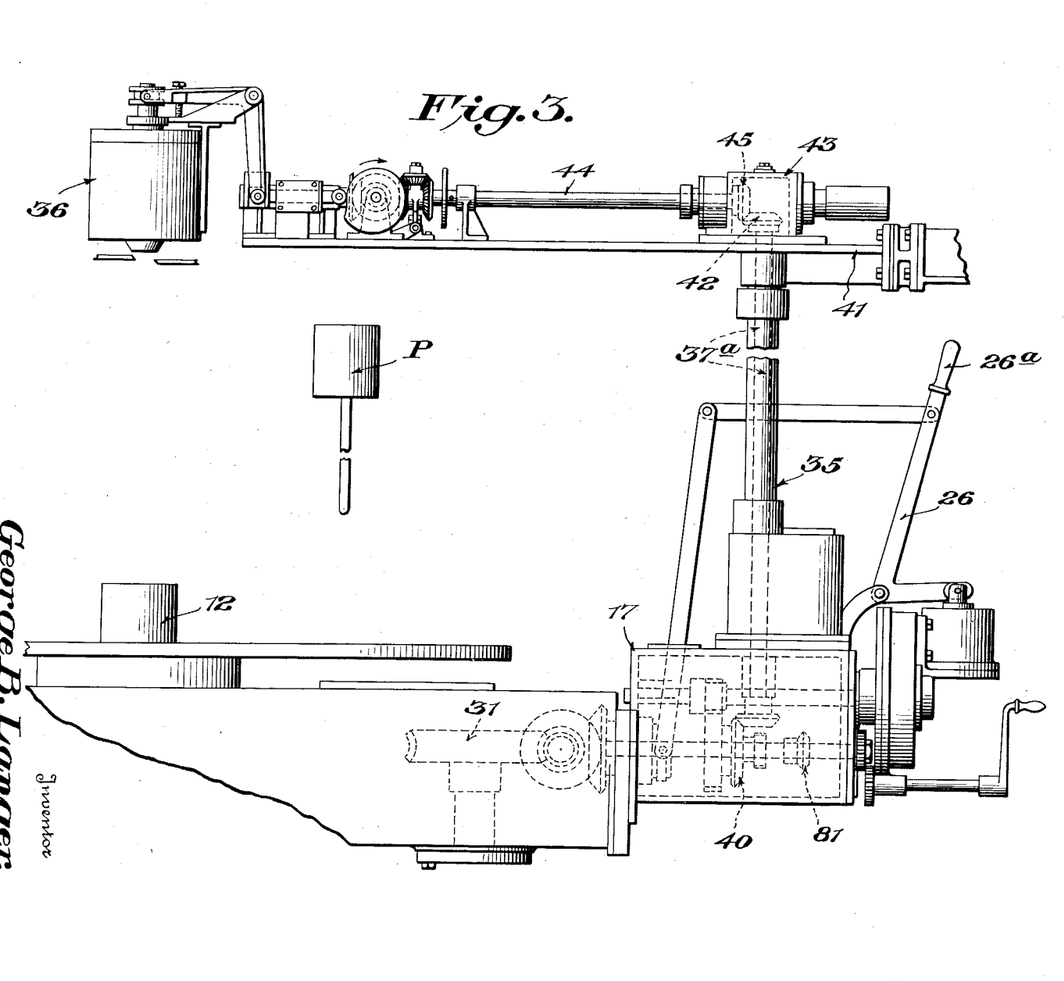
Fig. 3 is a diagrammatic view partly in side elevation illustrating a forming machine connected to a mechanical feeder, the latter being disposed at a different angular position with reference to the forming machine than as illustrated in Fig. 1.

A mechanically driven timer generally indicated at 35 for a mechanically driven feeder 36 or other mechanically driven auxiliary device may comprise a shaft 37 journalled in a bearing 38 in the housing 17 and fitted into its lower end with a bevel gear 39 in mesh with a gear 40 keyed to the sleeve 20. The upper end of the shaft 37ª (see Fig. 3ª) preferably extends above a supporting plate 41 and is fitted with a bevel gear 42 within a housing 43 adjustable horizontally on the plate 41 about the axis of the shaft 37ª. Within the housing 43 there is a feeder drive shaft 44 carrying a gear 45 in mesh with the gear 42, so that the shaft 44 may be driven at the proper speed while disposed at any desired angular position relative to the shaft 37. Of course the gear ratios between the gears 39—40 and the gears 42—45 are such that the shaft 44 makes a desired rotation relative to the sleeve 20. When the shaft 44 is designed to drive a mechanical feeder, the gearing is such that the feeder will normally operate once for each cycle or index of the forming machine.

The mechanically driven feeders may be of any of the approved well known types mechanically driven by a rotating shaft, the one illustrated herein being of the type shown in the Honiss Patent No. 2,039,242, of April 28, 1936.

Figure 1:
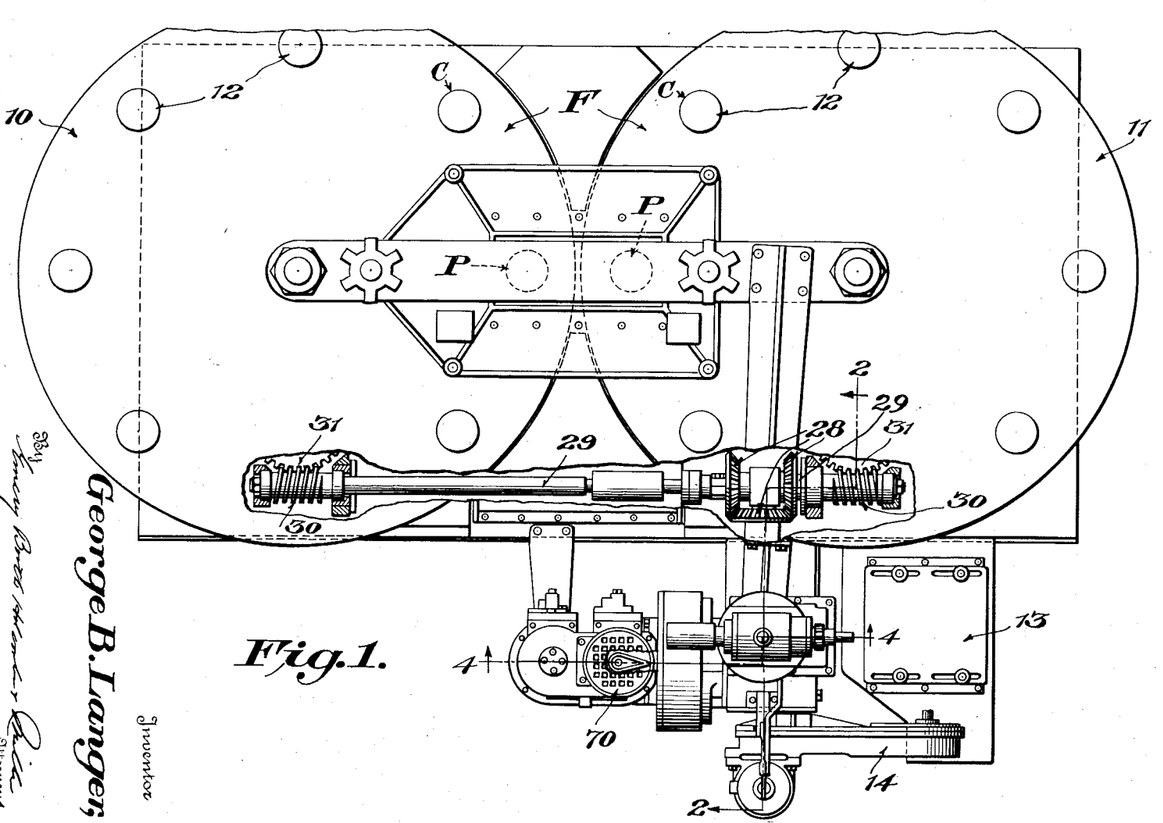
Fig. 1 is a plan view of my improved driving mechanism in position relative to a forming mechanism shown in outline.

In some cases it is desirable to have the feeder deliver two charges of glass during each cycle or indexing step of the forming machine, as for example, when a single feeder is used to deliver charges of glass to a tandem or duplex press machine as illustrated in Fig. 1. In such case it may be desirable to supply two charges of glass to the forming machine during each cycle or stop period.

My invention makes provision for such operation by providing a transmission 46 interposed between the shafts 37 and 37ª (see Fig. 2). This transmission 46 may comprise any simple two-speed transmission capable of driving the shaft 37ª at one of two speeds. In the illustrated form the shaft 37 rotates a gear 47 having end clutch teeth 47ª. The gear 47 meshes with gear 48 on a jack shaft 49 which also carries a gear 50 meshing with a shiftable gear 51 on shaft 37ª. The gears 48 and 50 are keyed to the shaft 49 and the gear 51 may be shifted manually by an operating lever 52. When the shiftable gear 51 is in mesh with the gear 50, the drive is through the jack shaft 49 and the shaft 37ª is rotated at one-half the speed of rotation of the shaft 37. When the shiftable gear 51 is lowered, the clutch teeth 51ª mesh with the clutch teeth 47ª on the gear 47, thus directly coupling shafts 37 and 37ª so that the speed of rotation of the shafts is the same.

Figure 4:
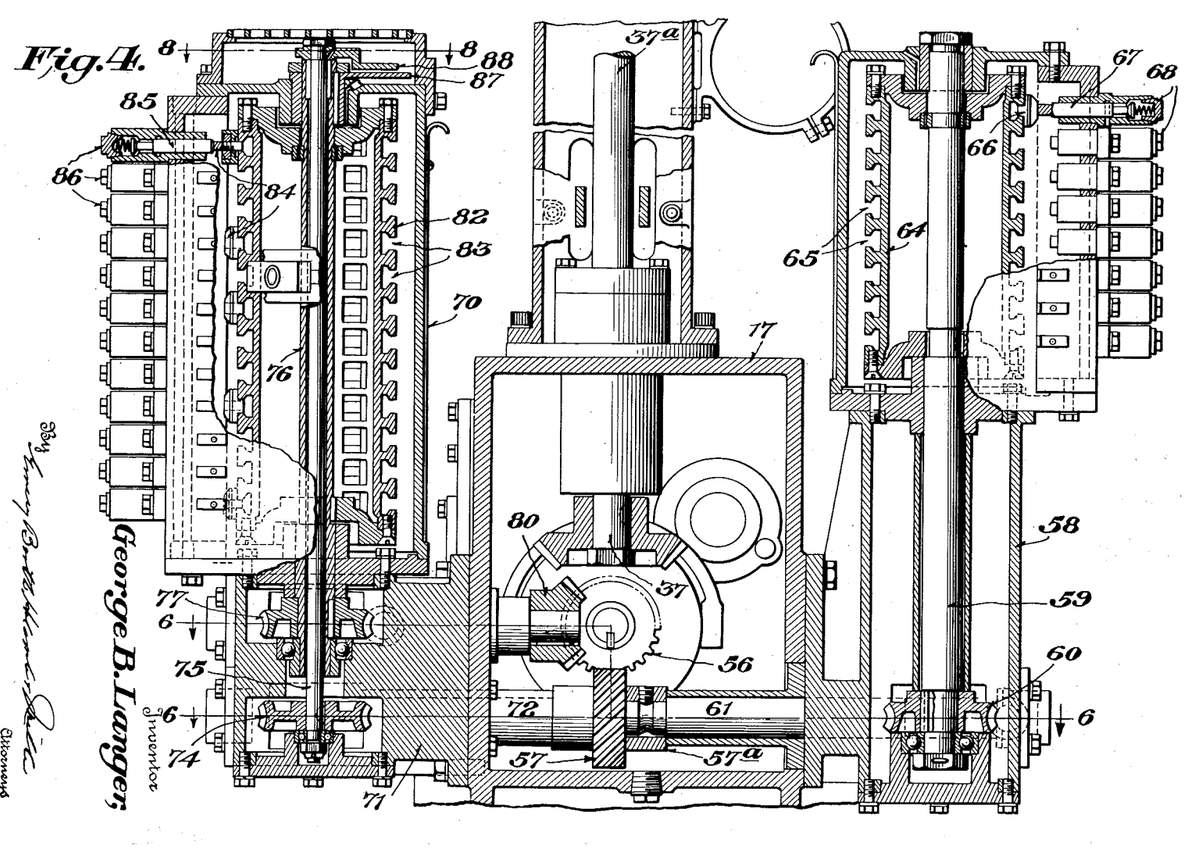
Fig. 4 is a vertical sectional view taken on the line 4—4 of Fig. 1, and illustrating a second or additional timer not illustrated in Fig. 1.

A second timing mechanism 55 is provided for pneumatically operating a pneumatically operated device, as for example, a pneumatically operated feeder 36ᴬ and advantageously this timer 55 is driven from a continuously rotating part of the driving mechanism, for example the sleeve 20 (see Figs. 2 and 4).

Figure 5:
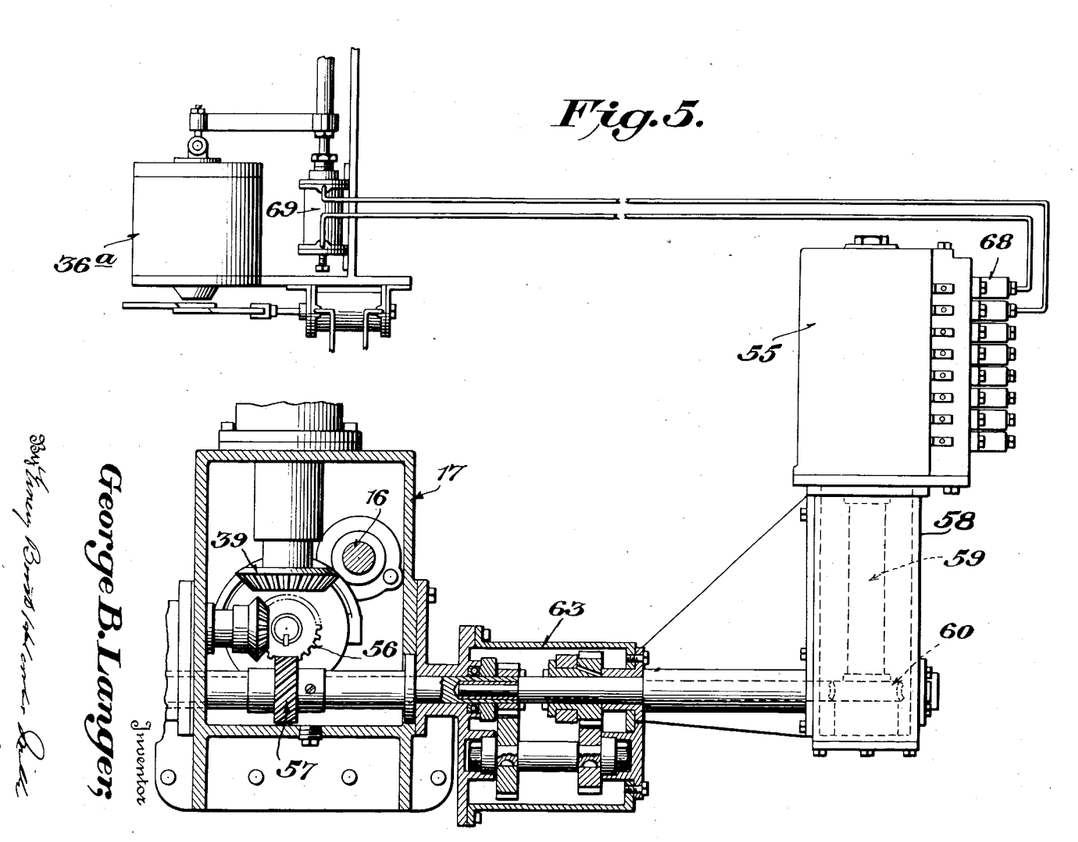
Fig. 5 is a view illustrating one manner of using the invention synchronizing a forming machine on a pneumatic feeder.
Figure 6:
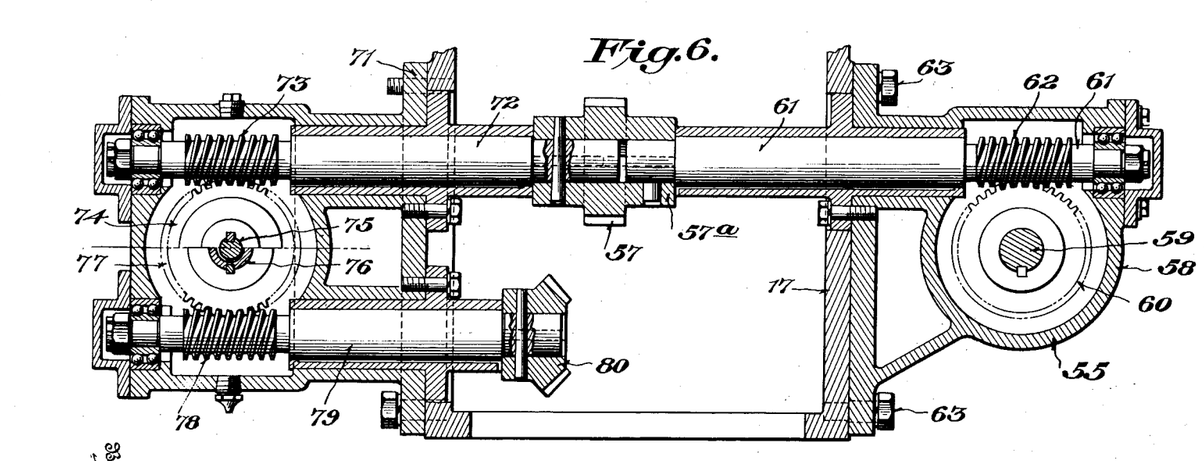
Fig. 6 is a horizontal section taken on the line 6—6 of Fig. 4.

In the illustrated embodiment, the sleeve 20 may be fitted with a helical gear 56 meshing with a similar gear 57 at right angles and having hollow hubs 57ª (Figs. 4 and 6). The timing unit 55 preferably comprises a casing 58 having a vertically disposed shaft 59 suitably journalled therein and fitted at its lower end with a worm wheel 60. A driven shaft 61 is also journalled in the lower end of the casing and is fitted with a worm 62 meshing with the worm 60, the opposite end of the shaft 61 extending beyond the casing 58 and is adapted to extend into the casing 17 to be pinned or otherwise connected to the hollow hub of the gear 57. The entire timing unit may thus be secured to or removed from the transmission casing 17 by means of bolts. Advantageously a two-speed transmission 63, in all respects like the transmission 46, may be interposed between the shaft 61 and the timer casing 58 (see Fig. 5).

A timing drum 64 is carried by the upper end of the shaft 59 (see Fig. 4) which drum is provided with a series of grooves 65 in which are adjustably mounted cams or buttons 66 adapted selectively to contact stems 67 of poppet valves 68 to admit air under pressure at the desired time to operate the pneumatically operated parts, such as the plunger raising and lowering cylinder 69, as will be understood. Proper adjustment of the cams 66 in the various grooves will act to open the various parts of a pneumatically operated device, in synchronism with the operations of the forming machine. The pneumatically operated feeder may be of any approved type known in the art, such as shown in the patent to Stenhouse 1,746,913, of February 11, 1930.

An additional timing mechanism 70 may be provided for timing pneumatically the operations of the various pneumatically operated devices of the forming machines so that they may be operated automatically in proper sequence to each other and in synchronism with the feeding device. In the illustrated embodiment, the pressing plunger P is shown as one of such pneumatically operated devices, although other fabricating, clamping and mold-opening and closing devices are contemplated.

This timing mechanism 70 (see Figs. 4 and 6) may advantageously comprise a base 71 adapted to be bolted to the housing 17. A transverse shaft 72 is journalled in the lower portion of the base, one end extending beyond the base and carrying the spiral gear 57 which meshes with the gear 56 on the sleeve 20, the opposite end of the shaft 72, within the base, being fitted with a worm 73 meshing with a worm wheel 74 on a vertically disposed indicator shaft 75. Thus the indicator shaft rotates in synchronism and at the same speed as the feeder timing shafts 37 and 61, as all are driven from the sleeve 20.

Surrounding the shaft 75 is a sleeve 76, to the lower end of which is secured a worm wheel 77 driven by a worm 78 on a shaft 79 journalled in the base 71. One end of the shaft 79 extends beyond the base and into the housing 17 (Fig. 6) and carries a bevel gear 80 adapted to mesh with a bevel gear 81 keyed to the driven shaft 22 (see Fig. 2).

Thus the sleeve 76 is geared to the shaft 22 and rotates synchronously with the indexing operation of the forming machine, only when the shaft 22 is clutched to the driving sleeve 20 (Fig. 2).

Secured to the sleeve 76 is a timing drum 82 having a plurality of circumferential grooves 83 in which are adjustably mounted cams or buttons 84 adapted selectively to engage at proper times the stems 85 of the puppet valves 86 controlling the volume of air under pressure to various pneumatically operated parts of the forming machine, such as the pressing plunger P as will be understood. Adjacent the upper end of the drum, the sleeve carries a gauge plate 87 which rotates therewith and which is surmounted by a pointer 88 fixed to the shaft 75 (see Fig. 7).

Figure 7:
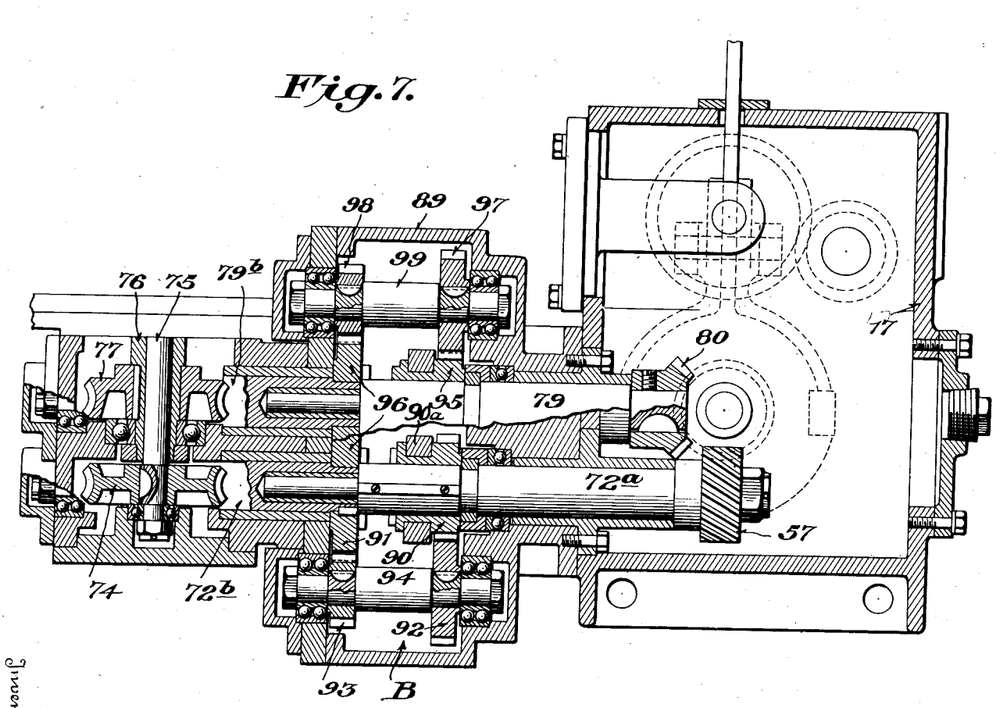
Fig. 7 is a sectional view of one form of the invention showing the transmission between the driving unit and the forming machine timer.

Advantageously a change speed gearing is interposed between the shafts 72 and 75 to the indicator and the shafts 79 and sleeve 76 to the timing drums 82. Such mechanism may be as shown in Fig. 7, including a transmission casing 89 in which is journalled a stub shaft 72ª carrying spiral gear 57. The stub shaft 72ª carries a shiftable gear 90, similar to the gear 51 shiftable manually by a lever indicated at 90ª and adapted to drive a gear 91 on stub shaft 72ᵇ through gears 92 and 93 on stub shaft 94 or to be clutched directly to gear 91. Similarly the stub shaft 79ª carries a shiftable gear 95 for driving gear 96 on the stub shaft 79ᵇ through gears 97—98 on stub shaft 99 or to be directly clutched to gear 96.

It will be noted from the construction shown in Figs. 4 and 6, that the shaft 75 and its pointer 88 rotate synchronously and at the same relative speed as the forming machine timing drum 82 and its gauge plate 87. As stated above, the shaft 75 and pointer 88 rotate continuously, being driven from sleeve 20 while the machine timing drum and gauge plate are rotated only while the machine indexing mechanism is in operation, these being driven from the drive shaft 22. Hence, when the forming machine is de-clutched from the driving mechanism, the shaft 75 and pointer 88 rotate relatively to the drum 82 and gauge plate 87.

Figure 8:
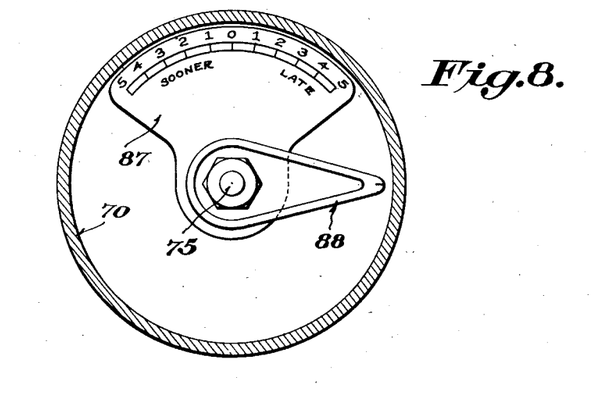
Fig. 8 is a plan view partly in section as taken on the line 8—8 of Fig. 4.

The gauge plate preferably is calibrated as shown in Fig. 8 so that after any stoppage of the forming machine, it may be re-clutched to the driving machine with the forming machine timer 70 and the feeder timers 35 and 55 in the same timing relation. For example, if it is desired to have the glass charge delivered by the feeder into the mold 12 at approximately the middle of the stop period of the mold at the charging or feeding station, the machine is always re-clutched as the pointer 88 registers with the central calibration O of the gauge plate. If it is desired to have the glass charge enter the mold earlier as the mold reaches the charging station, the machine is re-clutched as the pointer registers with a selected indicia to the left of the center of the gauge plate. Similarly the charge may be delivered to the mold 12 later as it is about to leave the charging station by re-clutching the machine when the pointer 88 registers with a selected indicia at the right of the gauge plate (Fig. 8). This re-clutching advantageously is manually effected by the operator, by shifting the clutch handle 26ª at the instant the pointer registers with a preselected indicia in the gauge plate, and he may thereby selectively vary the time the glass charge is in the mold at the charging station, prior to any fabrication thereof, in accordance with the type of ware being produced. By this means the timed relation or synchronization of the forming machine and feeder may be varied under different stages of operation.

Figure 9:
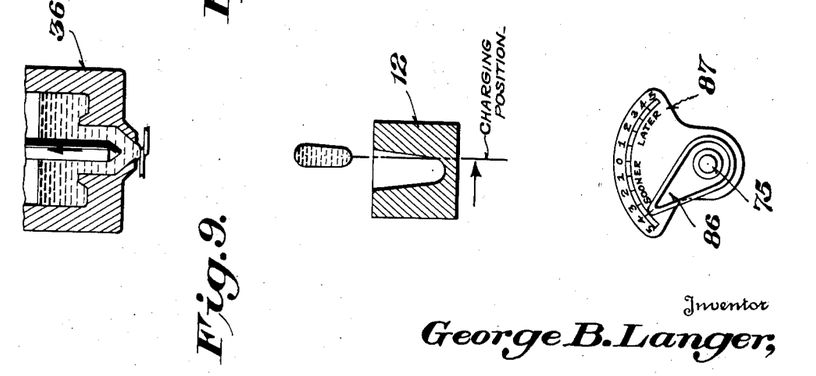
Figs. 9, 10 and 11 are diagrammatic views illustrating the wide range of flexibility of the invention for synchronizing the forming machine and feeder under different stages of operation.
Figure 10:
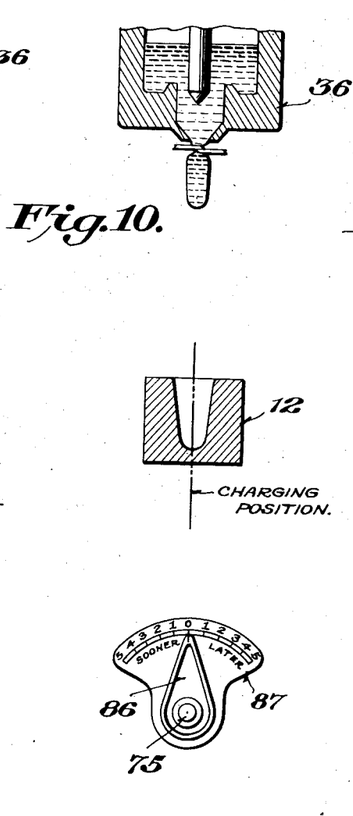
Figure 11:
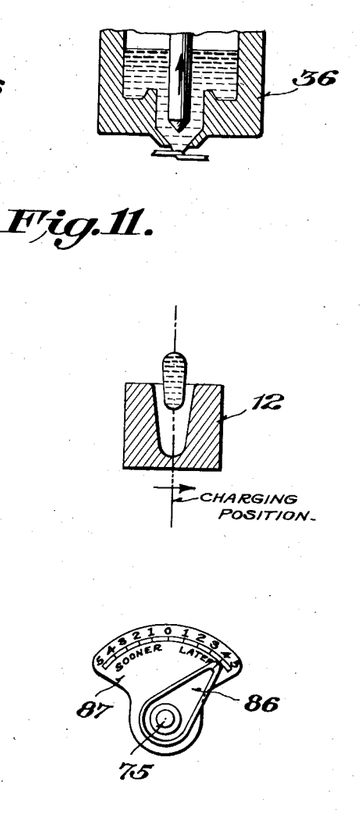

This is graphically illustrated in Figs. 9, 10 and 11. In Fig. 9 the forming machine has been re-clutched to the driving mechanism when the pointer 88 registers with an indicia indicating early charging. The feeder, therefore, is operated to form and shear the charge of glass prior to the time the mold reaches the charging station. As the mold reaches the charging station, the glass charge or gob is descending and the timing can be regulated so that the charge enters the mold immediately as the mold is stopped at the charging station. This is of advantage in the manufacture of certain types of ware where it is desired to have the hot glass charge fill and settle into the bottom of the mold prior to fabrication.

The opposite extreme is illustrated in Fig. 11 where the machine is re-clutched to the driving mechanism when the pointer 88 registers with one of the indicia to the right of the gauge plate 87. In this condition the feeder is timed to operate after the mold reaches the charging station and the charge is delivered to the mold just as the mold is leaving the charging station. In Fig. 10 an intermediate condition is shown wherein the charge is delivered to the mold at approximately midway of the stop period of the mold at the charging station.

The above described means for variably adjusting and regulating the timed relationship between the machine timer 70 and the feeder timer 38 or 55 under different stages of operation is of considerable advantage where other types of forming machines are used, for example, intermittent or continuously rotating machines adapted to manufacture a large variety of ware, where the time required for forming and delivering a predetermined charge of glass by the feeder varies considerably with the different kinds, sizes and weights of ware being made.

From the above description, it will be seen that my invention provides a new and improved driving and synchronizing mechanism for the synchronized operation of a mechanically driven forming machine and one or more auxiliary devices whether mechanically or pneumatically driven. The relative timing adjustment between the machine time and the feeder time permits of any control of the synchronized relationship for the satisfactory manufacture of a broad range of ware.

I claim:
1. A motor operated driving and synchronizing mechanism for glassware forming apparatus comprising a continuously motor driven shaft, a sleeve geared to and driven by said shaft, a driven shaft within the sleeve, a clutch for connecting the driven shaft to the sleeve, a mechanically driven forming machine geared to said driven shaft, a glass feeding device, a feeder timer geared to said continuously rotating sleeve for controlling the operation of said feeder, a change speed transmission interposed between said timer and sleeve, and pneumatically operated means for disengaging said clutch.

2. In combination, a mechanically driven glassware forming machine having a drive shaft geared to said forming machine, a glass feeding device for feeding charges of glass to said forming machine and a driving and synchronizing mechanism for said forming machine and feeding device, said mechanism comprising a continuously rotating sleeve surrounding said forming machine drive shaft, a clutch face on one end of said sleeve, a shiftable clutch member splined to said drive shaft for engagement with said clutch face, a driven gear on said sleeve, and means driven by said last named gear for operating said feeder in synchronism with said sleeve.

3. In combination, a mechanically driven glassware forming machine having an elongated drive shaft with a driven gear at one end thereof, a glass feeding device for feeding charges of glass to said forming machine, and a driving and synchronizing mechanism for said feeding device and forming machine drive shaft including a sleeve loosely mounted on said shaft, a clutch face on one end of said sleeve, a shiftable clutch member splined to said drive shaft for driving engagement with said clutch face, a driving gear keyed to said sleeve for continuously rotating said sleeve and clutch face, a driven gear keyed to said sleeve, and means connected to said last named gear for operating said feeder in synchronism with said sleeve.

4. In combination, a mechanically driven glassware forming machine, a glass feeding device for feeding charges of glass to said forming machine, and a driving and synchronizing mechanism for said forming machine and feeder, including a transmission housing, a forming machine drive shaft journalled in opposed walls of said housing, a forming machine drive gear on one end of said drive shaft, a sleeve loosely mounted on said shaft within said housing, a clutch face on one end of said sleeve, a shiftable clutch member splined on said shaft for driving engagement with said clutch face, a driving gear keyed to said sleeve for continuously rotating said sleeve and clutch face, a driven gear keyed to said sleeve, means connected to and driven by said last named gear for operating said feeder in synchronism with said sleeve, and means in said casing for engaging and driving said sleeve driving gear.

5. In combination, a mechanically driven glassware forming machine having an elongated drive shaft with a drive gear at one end thereof, a plurality of glass feeding devices, for feeding charges of glass to said forming machine, and a driving and synchronizing mechanism for said feeding device and forming machine drive shaft including a sleeve loosely mounted on said shaft, a clutch face on one end of said sleeve, a shiftable clutch member splined to said drive shaft for driving engagement with said clutch face, a driving gear keyed to said sleeve for continuously rotating said sleeve and clutch face, a plurality of driven gears keyed to said sleeve, and means connected to and driven by said last named gears for operating said feeders in synchronism with said sleeve.

6. In combination, a mechanically driven glassware forming machine having an elongated drive shaft with a drive gear at one end thereof, a glass feeding device for feeding charges of glass to said forming machine, and a driving and synchronizing mechanism for said feeding device and forming machine drive shaft including a sleeve loosely mounted on said shaft, a clutch face on one end of said sleeve, a shiftable clutch member splined to said drive shaft for driving engagement with said clutch face, a driving gear keyed to said sleeve for continuously rotating said sleeve and clutch face, a driven gear keyed to said sleeve, a driven shaft for operating said feeder and means connected to said last named gear for operating said driven shaft at a higher speed than said drive shaft.

7. In combination, a mechanically driven glassware forming machine having an elongated drive shaft with a drive gear at one end thereof, a glass feeding device for feeding charges of glass to said forming machine, and a driving and synchronizing mechanism for said feeding device and forming machine drive shaft including a sleeve loosely mounted on said shaft, a clutch face on one end of said sleeve, a shiftable clutch member splined to said drive shaft for selective driving engagement with said clutch face, a driving gear keyed to said sleeve for continuously rotating said sleeve and clutch face, a driven gear keyed to said sleeve, a driven shaft for operating said feeder and means connected to said last named gear and including a change speed transmission for operating said driven shaft at a higher speed than said drive shaft.

GEORGE B. LANGER.